US010422992B2

(12) United States Patent
Karasik (10) Patent No.: US 10,422,992 B2
(45) Date of Patent: Sep. 24, 2019

(54) CAMERA LENS WASHING DEVICE (71) Applicant: Methode Electronics, Inc., Carthage, IL (US)

(72) Inventor: Vladimir Karasik, Walled Lake, MI (US)

(73) Assignee: Methode Electronics, Inc., Carthage, IL (US)

( * ) Notice: Subject to any disclaimer, the term of this patent is extended or adjusted under 35 U.S.C. 154(b) by 0 days.

(21) Appl. No.: 15/428,706

(22) Filed: Feb. 9, 2017

(65) Prior Publication Data
US 2018/0081260 A1    Mar. 22, 2018

Related U.S. Application Data (63) Continuation-in-part of application No. 15/267,938, filed on Sep. 16, 2016, now Pat. No. 10,268,038.

(51) Int. Cl.
*G02B 27/00* (2006.01)
*G03B 17/02* (2006.01)
*G03B 17/56* (2006.01)

(52) U.S. Cl.
CPC ......... *G02B 27/0006* (2013.01); *G03B 17/02* (2013.01); *G03B 17/56* (2013.01)

(58) Field of Classification Search
CPC .... G02B 27/0006; G03B 17/568; B08B 3/02; B08B 3/04; B08B 2203/0211
See application file for complete search history.

(56) References Cited

U.S. PATENT DOCUMENTS

| 5,588,055 | A  | 12/1996 | Williamson et al. |
| 5,779,205 | A  | 7/1998  | Ching |
| 7,891,886 | B2 | 2/2011  | Schuetz |
| 8,243,137 | B2 | 8/2012  | Schuetz |
| 8,444,329 | B2 | 5/2013  | Nakamura et al. |
| 8,448,914 | B2 | 5/2013  | Roehr et al. |
| 8,671,504 | B2 | 3/2014  | Ono et al. |
| 8,821,043 | B2 | 9/2014  | Schutz |
| 8,836,789 | B2 | 9/2014  | Liepold et al. |

(Continued)

FOREIGN PATENT DOCUMENTS

| CN | 104768802 A   | 7/2015 |
| DE | 102011078230 A1 | 1/2013 |

(Continued)

*Primary Examiner* — Kimberly N. Kakalec
(74) *Attorney, Agent, or Firm* — Blank Rome LLP (57) ABSTRACT A compact camera lens washing device received in a shroud for mounting to a vehicle. The device includes a washer housing disposed in the shroud. The washer housing includes a ring portion and a fluid source attachment. The ring portion has a main opening that is generally aligned with a lens opening of the shroud for receiving the camera lens, an attachment side that is configured to mount the washer housing to the shroud, and a washing side that is configured to frame the camera lens. The washing side is in fluid communication with the fluid source attachment. Nozzles are disposed in a transition portion of the washer housing between the ring portion and the fluid source attachment of the washer housing. The nozzles are configured to discharge fluid from the washer side and radially inwardly towards the main opening that receives the camera lens.

22 Claims, 8 Drawing Sheets

(56) References Cited

U.S. PATENT DOCUMENTS

| | | |
|---|---|---|
| 8,857,687 B1 | 10/2014 | An |
| 8,961,044 B2 | 2/2015 | Barthel |
| 8,988,526 B2 | 3/2015 | Schutz |
| 9,150,165 B1 | 10/2015 | Fortin et al. |
| 9,193,308 B2 | 11/2015 | Okuda |
| 9,380,190 B2 | 6/2016 | Pawlowski |
| 9,380,192 B2 | 6/2016 | Barthel |
| 9,446,721 B2 | 9/2016 | Jagoda |
| 9,457,733 B2 | 10/2016 | Schutz |
| 9,487,161 B2 | 11/2016 | Rawlings et al. |
| 9,580,023 B2 | 2/2017 | Bruss et al. |
| 9,725,049 B2 | 8/2017 | Buschmann |
| 9,910,272 B2 | 3/2018 | Witte |
| 2009/0122141 A1 | 5/2009 | Nakamura et al. |
| 2009/0309971 A1 | 12/2009 | Schuetz |
| 2010/0040361 A1 | 2/2010 | Schuetz |
| 2011/0155874 A1 | 6/2011 | Roehr et al. |
| 2011/0292212 A1 | 12/2011 | Tanabe et al. |
| 2012/0007984 A1 | 1/2012 | Schutz |
| 2012/0207461 A1 | 8/2012 | Okuda |
| 2012/0315027 A1 | 12/2012 | Schutz |
| 2013/0182112 A1 | 7/2013 | Liepold et al. |
| 2013/0294758 A1 | 11/2013 | Barthel |
| 2013/0335624 A1 | 12/2013 | Barthel |
| 2014/0085467 A1 | 3/2014 | Barthel |
| 2014/0169866 A1 | 6/2014 | Bruss et al. |
| 2015/0008300 A1 | 1/2015 | Jagoda |
| 2015/0030319 A1 | 1/2015 | Matori |
| 2015/0042804 A1 | 2/2015 | Okuda |
| 2015/0097013 A1 | 4/2015 | Rawlings et al. |
| 2015/0109447 A1 | 4/2015 | Okuda |
| 2015/0185592 A1* | 7/2015 | Eineren .................. G03B 17/02 348/375 |
| 2015/0203077 A1 | 7/2015 | Gokan |
| 2015/0258944 A1 | 9/2015 | Buschmann |
| 2015/0274089 A1 | 10/2015 | Schutz |
| 2015/0343999 A1 | 12/2015 | Lopez Galera et al. |
| 2015/0344001 A1 | 12/2015 | Lopez Galera et al. |
| 2015/0353057 A1* | 12/2015 | Witte ........................ B08B 3/04 134/115 R |
| 2016/0001330 A1 | 1/2016 | Romack et al. |
| 2016/0101735 A1 | 4/2016 | Trebouet |
| 2016/0103316 A1 | 4/2016 | Rousseau |
| 2016/0245011 A1 | 8/2016 | Schuetz |
| 2016/0272163 A1* | 9/2016 | Dreiocker ................ B60S 1/56 |
| 2016/0347258 A1 | 12/2016 | Buss |
| 2017/0050581 A1 | 2/2017 | Buss |
| 2017/0064161 A1 | 3/2017 | Buss |
| 2017/0106808 A1 | 4/2017 | Fuchs et al. |
| 2017/0259789 A1* | 9/2017 | McAndrew ............. B60S 1/528 |
| 2018/0201232 A1* | 7/2018 | Ringler .................... B60S 1/52 |

FOREIGN PATENT DOCUMENTS

| | | |
|---|---|---|
| EP | 1648737 B1 | 11/2006 |
| EP | 3103684 A1 | 12/2016 |
| GB | 1 597 004 A | 9/1981 |
| WO | WO-2008014870 A1 | 2/2008 |
| WO | WO-2009056510 A1 | 5/2009 |
| WO | WO-201511439 A1 | 1/2015 |
| WO | WO-2016083317 A1 | 6/2016 |
| WO | WO-2016177577 A1 | 11/2016 |

* cited by examiner

CAMERA LENS WASHING DEVICE

RELATED APPLICATION

The present application is a continuation-in-part of U.S. patent application Ser. No. 15/267,938, entitled Camera Lens Washing Device, filed on Sep. 16, 2016, the subject matter of which is incorporated herein by reference.

FIELD OF THE INVENTION

The present invention relates to a device for effectively and efficiently washing a lens of a camera, such as a camera located on a vehicle, that has a simplified design with no impact on the angle of view.

BACKGROUND OF THE INVENTION

The lenses of cameras mounted to vehicles often become dirty due to environmental and weather conditions, thereby impacting safe driving. Cleaning devices exists to address this problem. See, for example, U.S. Published Patent Application Nos. 2016/0103316 to Rousseau, 2016/0101735 to Trebouet, 2016/0001330 to Romack et al, 2015/0344001 to Lopez Galera et al., 2015/0343999 to Lopez Galera et al., 2015/0203077 to Gokan, and 2011/0292212 to Tanabe et al., the subject matter of each of which is herein incorporated by reference. However, such conventional cleaning devices are often ineffective, bulky, and obstruct the camera's field of view.

Therefore, a need exists for a camera lens washing device that effectively and efficiently washes the camera lens while also having a compact profile and not obstructing the field of view of the camera lens.

SUMMARY OF THE INVENTION

Accordingly, the present invention may provide a camera lens washing device that includes an outer housing that has a main opening for receiving a camera lens, an attachment end configured to mount to a camera housing of the camera lens, and an exposed end remote from the attachment end. The exposed end includes an end face that has a recessed area extending inwardly therefrom. An inner ring is received in the recessed area of the outer housing which is configured to frame the camera lens. A plurality of nozzles are defined between the outer housing and the inner ring. The plurality of nozzles are configured to discharge fluid radially inwardly towards the camera lens. The inner ring may be substantially stationary with respect to the outer housing.

The present invention may also provide a camera lens washing device that includes an outer housing that has a main opening for receiving a camera lens. The main opening has opposite top and bottom sides. The outer housing also has an attachment end configured to mount to a camera housing of the camera lens and an exposed end remote from the attachment end. The exposed end includes an end face that has a recessed area extending inwardly therefrom. An inner ring is received in the recessed area of the outer housing which is configured to frame the camera lens. A plurality of nozzles are defined between the outer housing and the inner ring. The plurality of nozzles may be disposed at or near the top side of the main opening of the outer housing such that the plurality of nozzles are configured to discharge fluid radially inwardly towards the bottom side of the main opening of the outer housing.

The present invention may further provide a camera lens washing device that comprises a unitary one-piece washer housing that includes a ring portion and a fluid source attachment. The ring portion has a main opening for receiving a camera lens, an attachment side configured for mounting the washer housing, such as in a shroud, and a washing side configured to frame the camera lens. The washing side is in fluid communication with the fluid source attachment. A plurality of nozzles are disposed in a transition portion of the washer housing between the ring portion and the fluid source attachment of the washer housing. The plurality of nozzles are configured to discharge fluid to the washer side radially inwardly towards the main opening for receiving the camera lens. In a preferred embodiment, the washer housing is a compact design.

The present invention may yet further provide camera lens washing device that comprises a shroud that has a front face, a rear opening opposite the front face, and an inner receiving area therebetween. The front face has a lens opening for receiving a camera lens. A washer housing is disposed in the receiving area of the shroud. The washer housing includes a ring portion and a fluid source attachment. The ring portion has a main opening that is generally aligned with the lens opening of the shroud for receiving the camera lens, an attachment side that is configured to mount the washer housing to the shroud, and a washing side that is configured to frame the camera lens. The washing side is in fluid communication with said fluid source attachment. A plurality of nozzles are disposed in a transition portion of the washer housing between the ring portion and the fluid source attachment of the washer housing. The plurality of nozzles are configured to discharge fluid to the washer side and radially inwardly towards the main opening for receiving the camera lens. In a preferred embodiment, the washer housing is a compact design such that when received in the shroud, the top wall of the shroud covers the fluid source attachment which extends through the rear opening of the shroud.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures.

DETAILED DESCRIPTION OF THE INVENTION

Referring to FIGS. 1-7, 8A, 8B, 9-11, 12A, 12B, 13 and 14, the present invention relates to a washing device 100, 100', or 100" for a camera lens 10, such as for a camera mounted on a vehicle. The camera lens washing device 100, 100', or 100" has a simplified design while providing improved washing and field of view of the lens.

As seen in FIGS. 1-7, the camera lens washing device 100 and 100' generally includes an outer housing 102 and an inner ring 104 that cooperate with one another to form multiple nozzles 106 therebetween that are preferably disposed around a top side of the camera lens 10 for discharging fluid, such as water or other lens washing fluid, radially inwardly and toward the camera lens 10 for cleaning the same. The washing fluid is preferably under pressure to be distributed through the nozzles 106 creating multiple fluid jets from different locations toward the center of the camera lens 10. The camera lens washing device 100 and 100' has an improved compact design and camera field of view.

Figure 1:
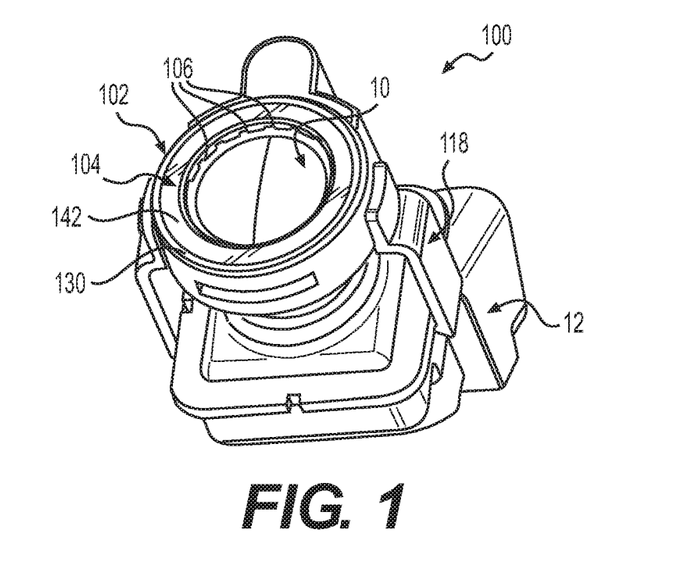
FIG. 1 is a perspective view of a camera lens washing device according to an exemplary embodiment of the present invention.

Outer housing 102 generally includes a main body 110 that may be substantially ring shaped and includes a main opening 112 therein for receiving the camera lens 10. One end of main body 110 is an attachment end 114 configured to mount to a camera housing 12 of the lens 10. The other end of main body 110 is an exposed end 116, as best seen in FIG. 1. In one embodiment, attachment end 114 includes one or more latching arms 118 that extend from main body 110 in a direction away from exposed end 116 for snap fitting onto the camera housing 12. Alternatively, attachment end 114 may include other known methods of attachment, such as screw fastening or adhesive. Main opening 112 of outer housing 102 includes a top side 120 and an opposite bottom side 122. A fluid source attachment 124 is provided in the outer housing 102 that is configured for engagement with a fluid source, such as a water hose or line. Fluid source attachment 124 may be an extension with an inner bore 126 in fluid communication with the nozzles 106. Fluid source attachment 124 is preferably located at the top side 120 of main opening 112 in outer housing 102 to allow the fluid to flow downwardly towards the nozzles 106.

Figure 4:
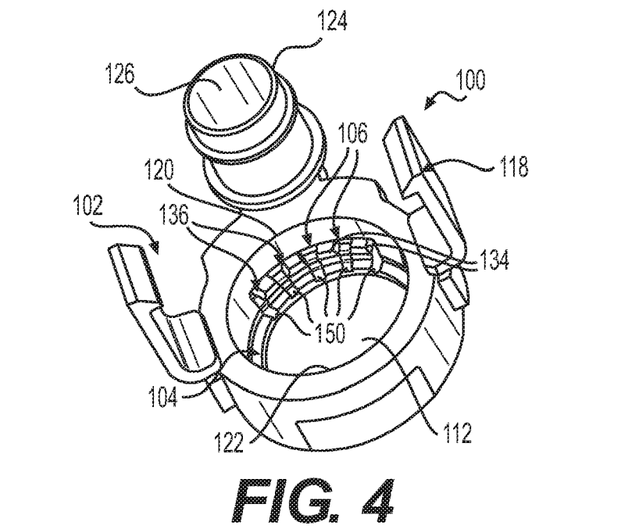
FIG. 4 is a perspective view of a housing subassembly of the camera lens washing device illustrated in FIG. 1.
Figure 5:
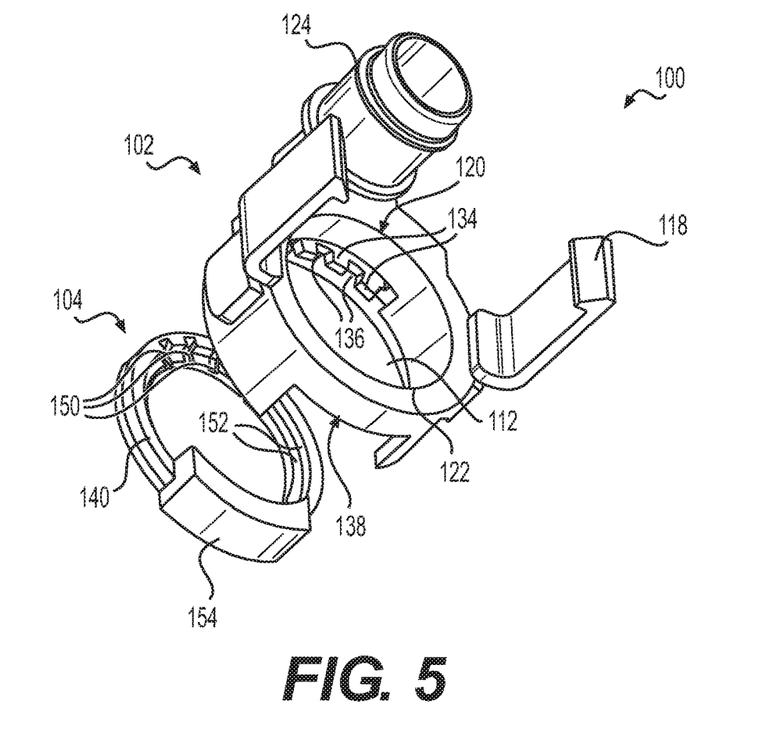
FIG. 5 is an exploded perspective view of the housing subassembly illustrated in FIG. 4.

Exposed end 116 of outer housing 102 includes an end face 130. A recessed area 132 extends inwardly from end face 130 for accepting inner ring 104. Extending inwardly from main opening 112 are spaced tabs 134 which define fluid path slots 136 therebetween, as best seen in FIGS. 4 and 5, which are in fluid communication with fluid source attachment 124. Spaces tabs 134 may be located adjacent to recessed area 132. Remote from the spaced tabs 134 on main body 110 is an alignment member 138 for aligning inner ring 104 with respect to outer housing 102.

Figure 2:
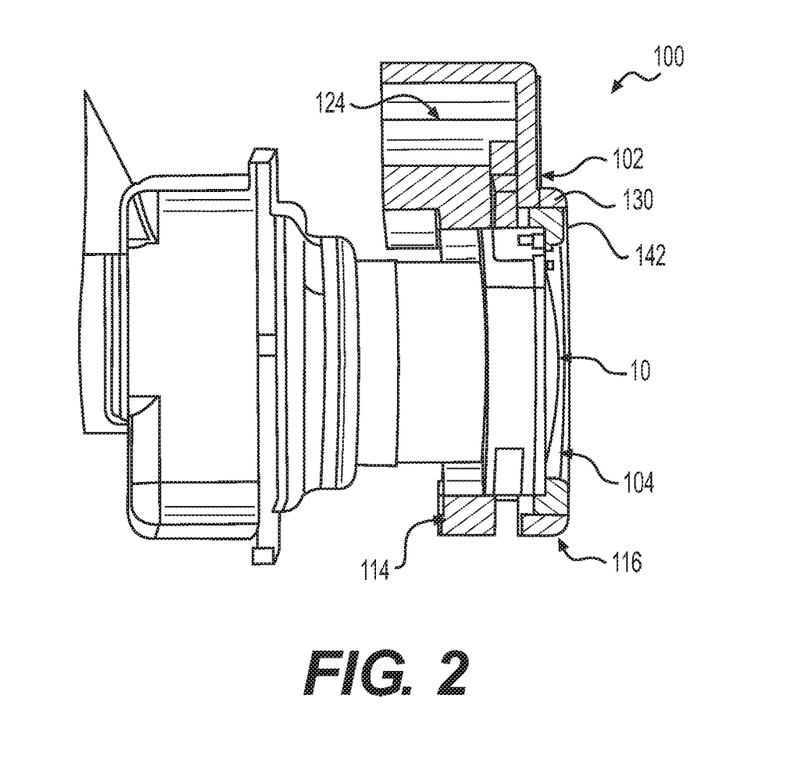
FIG. 2 is side elevational cross-sectional view of the camera lens washing device illustrated in FIG. 1.
Figure 3:
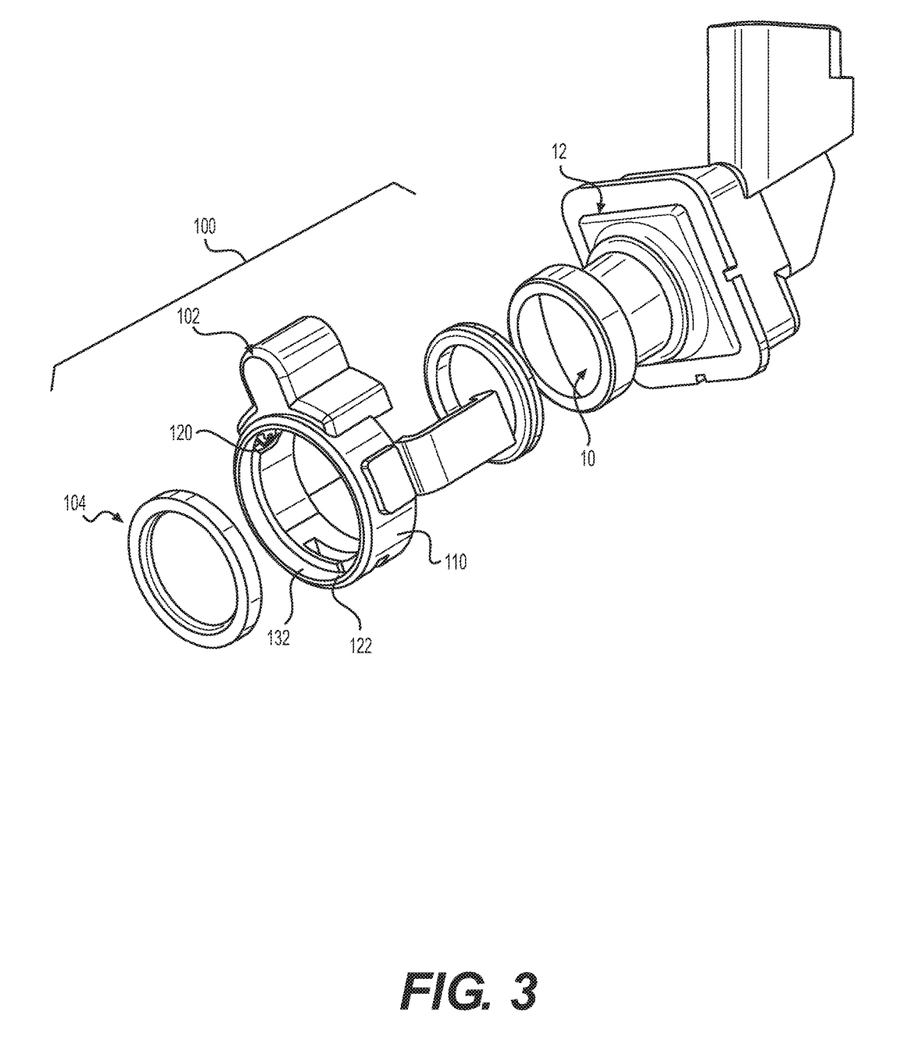
FIG. 3 is an exploded perspective view of the camera lens washing device illustrated in FIG. 1.

Inner ring 104 is configured and sized to frame the camera lens 10, as best seen in FIG. 1. Inner ring 104 is preferably formed separately from outer housing 102 and is received in recessed area 132 of outer housing 102. Inner ring 104 may be fixed to outer housing 102, such as by laser welding inner ring 104 in recessed area 132 or by other known attachments. Inner ring 104 includes a mounting face 140 (FIG. 5) that engages recessed area 132 and an opposite exposed face (FIG. 1) 142. An inner diameter surface 144 of inner ring 104 is between mounting face 140 and exposed face 142. In a preferred embodiment, exposed face 142 of inner ring 104 does not extend beyond and is substantially flush with end face 130 of outer housing 102, as seen in FIG. 2, thereby not negatively impacting the camera's field of view.

A plurality of channels 150 are provided in inner diameter surface 144 of inner ring 104, as best seen in FIGS. 4 and 5. Channels 150 substantially align with fluid path slots 136 of outer housing 102 to form the nozzles 106. Each channel 150 substantially aligns with one of the fluid path slots 136 to form one of the nozzles 106. Each channel 150 preferably extends into mounting face 140 of inner ring 104 and may include a step 152 to facilitate fluid flow through nozzles 106.

Remote from channels 150 is an alignment member 154 that corresponds to alignment member 138 of outer housing 102 to ensure proper alignment between inner ring 104 and outer housing 104 to form the nozzles 106. In one embodiment, alignment member 154 may be a protruding flange (FIG. 5), for example, and alignment member 138 may be a cut-out in main body 110 sized to accept flange 154, or vice versa. The alignment member 138 preferably includes a channel that allows the fluid or water from the fluid source attachment 126 to pass therethrough to the channels 150 and slots 136 of nozzles 106.

Other alignment or keying methods may be used as long as channels 150 and slots 136 are substantially aligned in order to form the nozzles 106. Nozzles 106, including tabs 134 and channels 150, are preferably located at or near the top side 120 of main opening 112 such that fluid from fluid source attachment 124 can flow downwardly through slots 136 and channels 150 so that nozzles 106 discharge the fluid directly onto the camera lens 10. And because nozzles 106 are on the top of the lens 10, gravity will subsequently wash away the fluid from the lens 10. In a preferred embodiment, none of the nozzles 106 are located at the bottom, that is the bottom side 122 of the main opening 112 such that the nozzles 106 are only provided near or at top side 120. The nozzles 106 may be evenly spaced from one another and radially arranged with respect to the lens 10, as best seen in FIG. 4.

A sealing member 160 (FIG. 3), such as a seal ring, may be provided on attachment end 114 to seal the plurality of channels 150 and slots 136 between inner ring 104 and outer housing 102.

Figure 6:
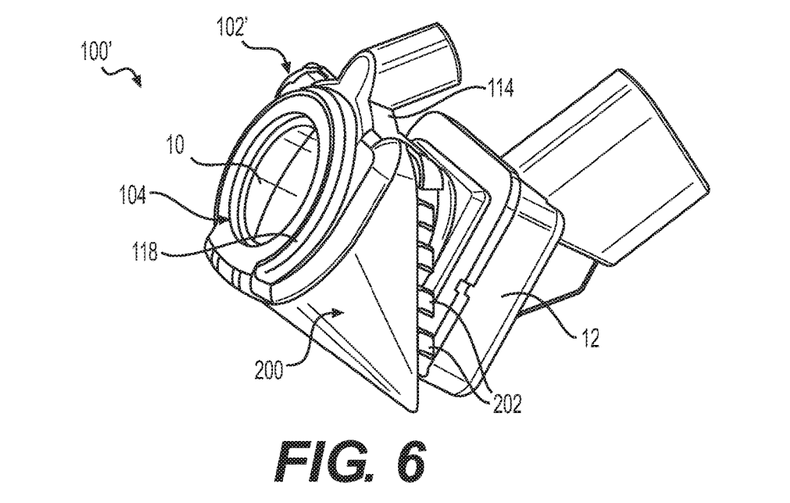
FIG. 6 is a perspective view of a camera lens washing device according to an alternative exemplary embodiment of the present invention.
Figure 7:
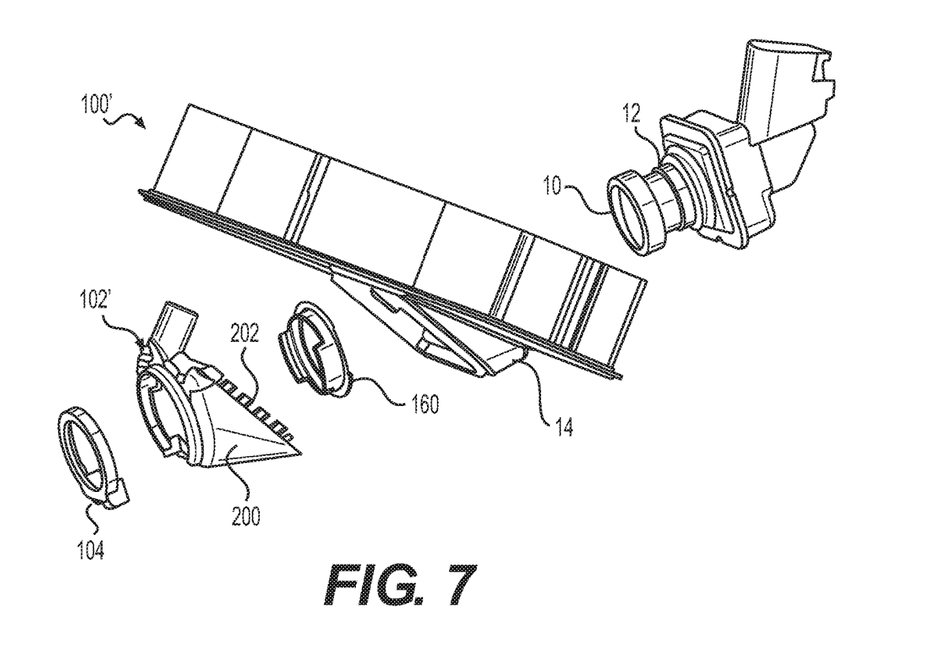
FIG. 7 is an exploded perspective view of the camera lens washing device illustrated in FIG. 6.
Figure 8A:
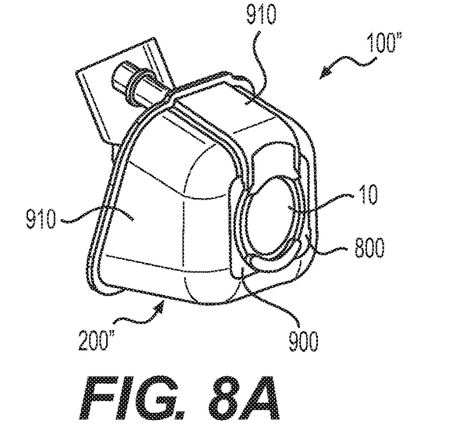
FIGS. 8A and 8B are perspective views a camera lens washing device according to yet another exemplary embodiment of the present invention.
Figure 8B:
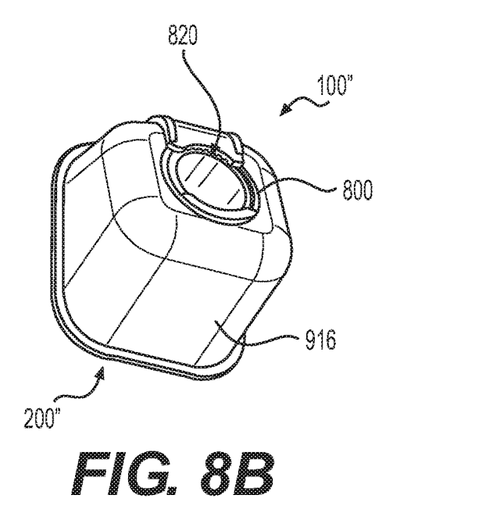
Figure 9:
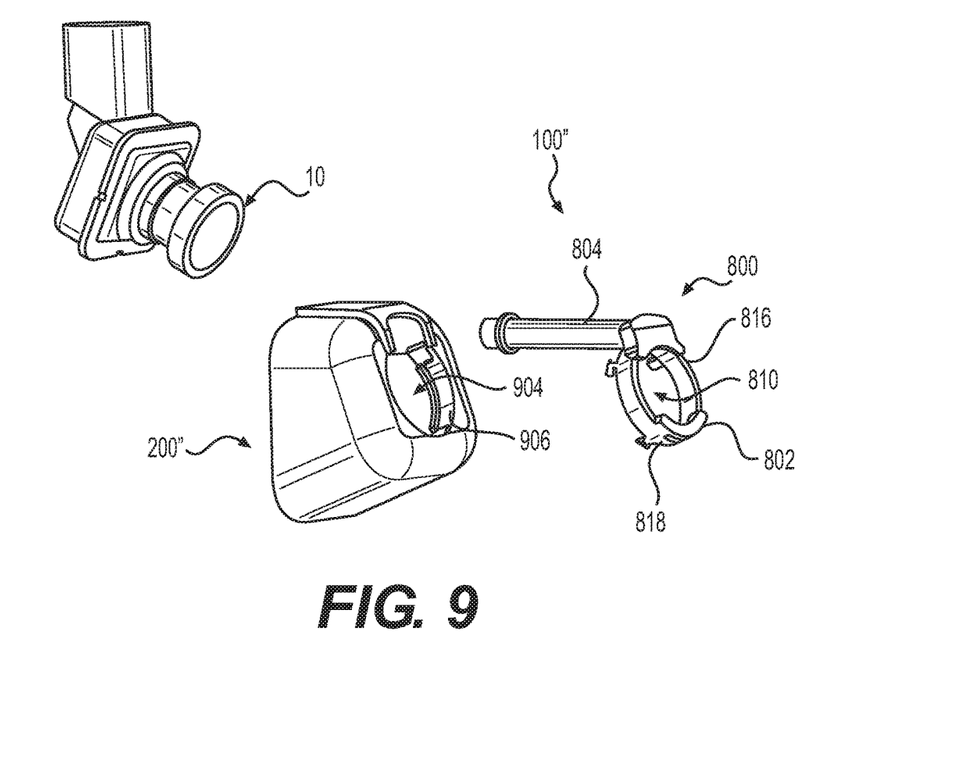
FIG. 9 is an exploded view of the camera lens washing device illustrated in FIGS. 8A and 8B.

FIGS. 6 and 7 illustrate an alternative embodiment of the camera lens washing device 100'. Camera lens washing device 100' is substantially the same as the camera lens washing device 100 of the first embodiment, except that the outer housing 102' thereof includes shroud extension 200 for attaching to a camera module 14 that supports the camera lens 10. Shroud extension 200 replaces latch arms 118 and may include an engagement member 202, such as a plurality of teeth, for engaging the camera module 14. Shroud extension 200 is extends away from the exposed end 116 of outer housing 102' and is preferably sized to substantially surround the camera lens.

Figure 12A:
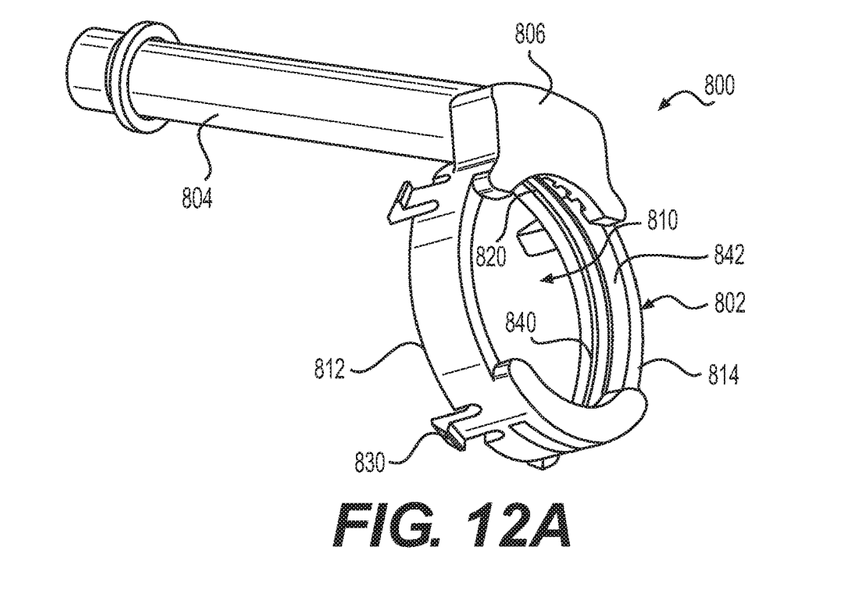
FIGS. 12A and 12B are perspective views of a washer housing of the camera lens washing device illustrated in FIGS. 8A and 8B.
Figure 12B:
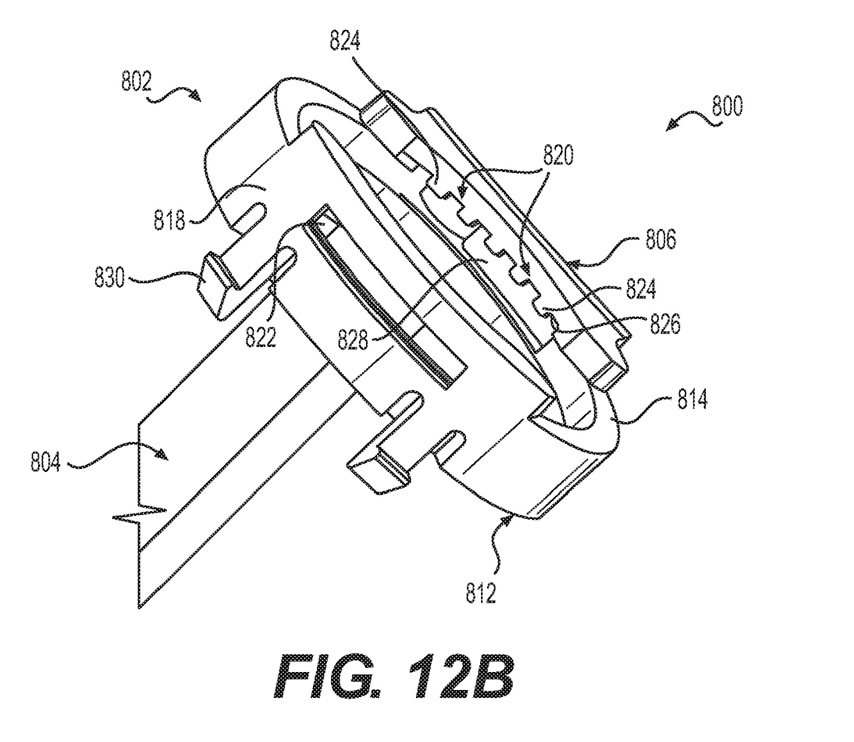
Figure 13:
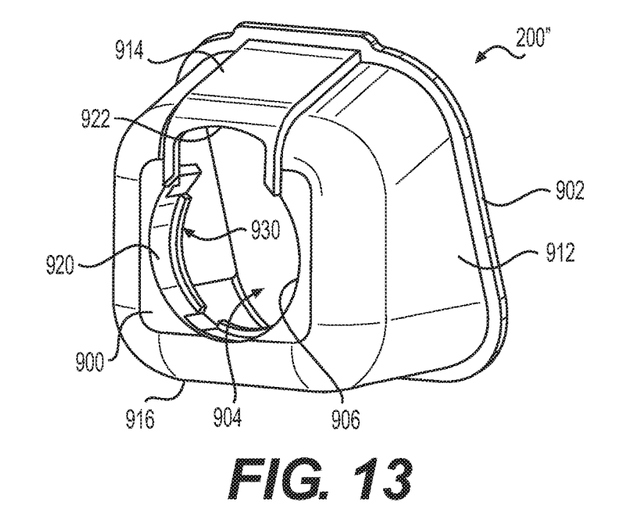
FIG. 13 is a front perspective view of a shroud of the camera lens washing device illustrated in FIGS. 8A and 8B.
Figure 14:
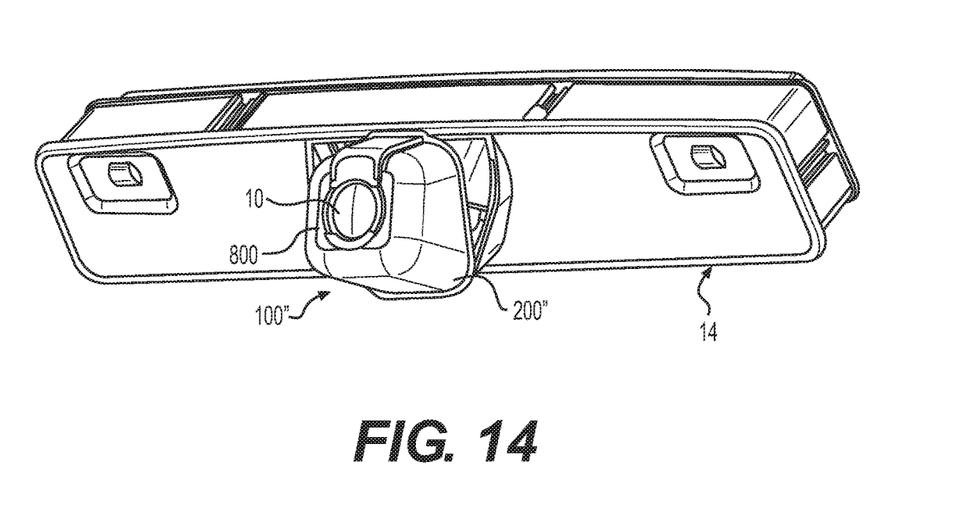
FIG. 14 is a perspective view of the camera lens washing device illustrated in FIGS. 8A and 8B, showing the device supported by the camera module.

FIGS. 8A, 8B, 9-11, 12A, 12B, 13 and 14 illustrate yet another exemplary embodiment of a camera lens washing device 100" in accordance with the present invention. Camera lens washing device 100" has fewer components and provides a fluid source attachment that is positioned inside of the shroud 200" (FIG. 10) resulting in a more compact design overall. The shroud 200" is configured to mount to the camera module 14 that is in turn mounted to the vehicle, such as at the tailgate of the vehicle. By providing a more compact camera lens washing device 100" with the fluid source attachment inside of the shroud 200", the existing vehicle structure, such as the tailgate structure, is not affected and requires no modification to mount device 100". For example, no additional holes are needed in the tailgate structure, which is typically sheet metal, to mount the compact camera lens washing device 100", as seen in FIG. 14. By eliminating the need for additional holes in the tailgate structure, integrity problems associated with holes located too close to the welds of the tailgate structure can be avoided. Additionally, this compact design also avoids the difficulty in punching holes in the tailgate structure due to the welds thereof have hardening the structure and the limited space for the holes.

Camera lens washing device 100" comprises a washer housing 800 that includes a ring portion 802, a fluid source attachment 804, and a transition portion 806 therebetween. In a preferred embodiment, washer housing 800 is a unitary one-piece member. The unitary one-piece washer housing 800 may be formed by a molding process, for example. Ring portion 802 generally includes a main opening 810 for receiving the camera lens 10, an attachment side 812 for mounting housing 800 to shroud 200", and a washing side 814 that frames the camera lens 10 and is in fluid communication with fluid source attachment 804 through transition portion 806. The attachment side 812 preferably includes one or more engagement members 830 for engaging shroud 200". The engagement members 830 may be snap legs, for example, that extend from attachment side 812. A sealing member 840, such as a rubber gasket, may be provided on the inner surface 842 of ring portion 802 around main opening 810 to seal the area behind washing side 814.

Fluid source attachment 804 of washer housing 800 extends from transition portion 806 in a direction away from washing side 814 and toward the direction in which attachment side 812 faces, as best seen in FIG. 12A. Fluid source attachment 804 may be, for example, a hose portion of washer housing 800 that extends from transition portion 806 and accepts the fluid for washing the camera lens 10.

One or more nozzles 820 are disposed on transition portion 806 at the top 816 of ring portion 802 on the washing side 814 thereof. Each nozzle 820 is designed to discharge fluid received from fluid source attachment 804 generally radially inwardly and downwardly towards main opening 810 and the camera lens 10, in a similar manner as the above embodiments. The bottom 818 of the ring portion 802 does not include any nozzles 820. That is, the nozzles 820 are disposed only at or near the top 816 of ring portion 802. Bottom 818 may include a lateral slot 822 (FIG. 12B) that facilitates the molding process when forming washer housing 800.

Figure 11:
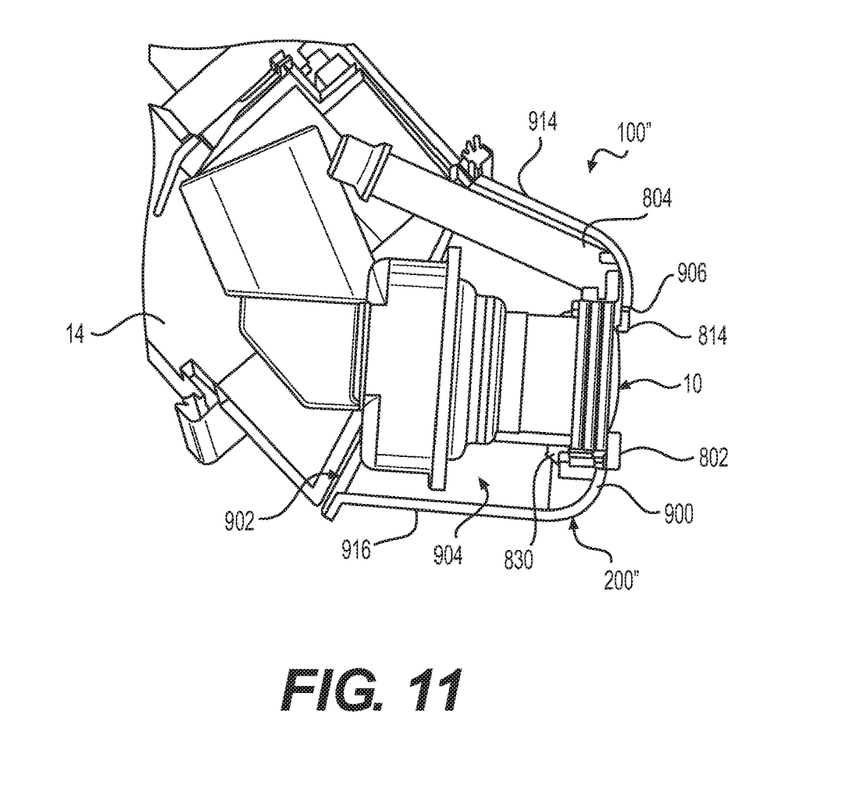
FIG. 11 is a side elevational cross-sectional view of the camera lens washing device illustrated in FIGS. 8A and 8B, showing the device supported by a vehicle camera module.

As seen in FIGS. 12A and 12B, the one or more nozzles 820 are defined by one or more tabs 824 extending from transition portion 806 toward main opening 810. The tabs 824 define fluids path slots 826 therebetween of nozzles 820 which direct the fluid towards camera lens 10 (FIG. 11). A recessed area 828 may be provided at the top 816 of ring portion 802 adjacent or near the tabs 824 to facilitate fluid flow to main opening 810.

Shroud 200" generally includes a front face 900, a rear opening 902 opposite the front face 900, an inner receiving area 906, opposite sidewalls 910 and 912 extending between front face 900 and rear opening 902, and top and bottom walls 914 and 916 extending between sidewalls 910 and 912, as best seen in FIG. 13.

Front face 900 has a lens opening 906 sized to accept ring portion 802 of washer housing 800 and the camera lens 10. As seen in FIG. 11, ring portion 802 is positioned in lens opening 906 such that washer side 814 of ring portion 802 is generally flush, that is flush or nearly flush, with front face 900 of shroud 200". Lens opening 906 includes an open extension 922 adapted to receive transition portion 806 of washer housing 800. The inner surface 920 of lens opening 906 includes one or more engagement members 930 corresponding to the one or more engagement members 830 of washer housing 800. Engagement members 930 of shroud 200" may be one or more tongues on which the snap legs of the engagement members 830 of ring portion 802 can snap to secure housing 800 to shroud 200". It will be appreciated that engagement members 830 and 930 may be either one of a tongue or snap leg and may be any other known engagement, as long as housing 800 is attached to shroud 200".

Figure 10:
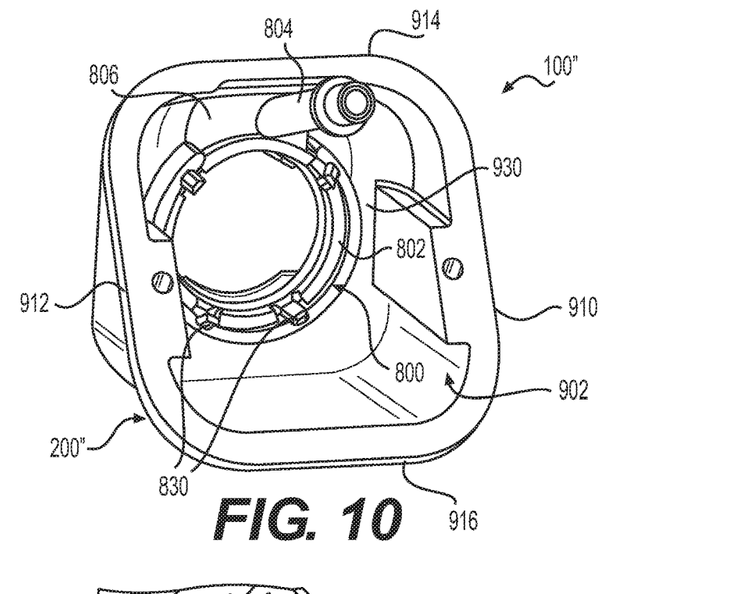
FIG. 10 is a rear perspective view of the camera lens washing device illustrated in FIGS. 8A and 8B, showing the device without the camera for clarity.

Washer housing 800 is compact in nature such that it can be received inside shroud 200", that is in inner receiving area 904, such that fluid source attachment 804 does not extend through or from any walls, including front face 900, sidewalls 910 and 912, and top and bottom walls 914 and 916 of shroud 200" and instead only extends through rear opening 902. In other words, as best seen in FIG. 10, fluid source attachment 804 can extend through the shroud's rear opening 902 for attachment to a fluid source with the top wall 914 of shroud 200" covering fluid source attachment 804. When installing the camera into the shroud's receiving area 904, the camera abuts the attachment side 812 of washer housing 800 such that the camera lens 10 is received in the main opening 810 of washer housing 800. Once the camera is installed, a locking bracket may be used to secure the camera in place in the overall camera module 14.

While particular embodiments have been chosen to illustrate the invention, it will be understood by those skilled in the art that various changes and modifications can be made therein without departing from the scope of the invention as defined in the appended claims.

What is claimed is:

1. A camera lens washing device, comprising:
   a unitary one-piece washer housing including a ring portion and a fluid source attachment, said ring portion having,
      a main opening for receiving a camera lens,
      an attachment side configured for mounting said washer housing, and
      a washing side configured to frame the camera lens, said washing side being in fluid communication with said fluid source attachment,
   a plurality of nozzles being disposed in a transition portion of said washer housing between said ring portion and said fluid source attachment of said washer housing, said plurality of nozzles being configured to discharge fluid to said washer side radially inwardly towards said main opening for receiving the camera lens, and a recessed area associated with the plurality of nozzles configured to facilitate fluid flow to said main opening.

2. A camera lens washing device according to claim 1, wherein
said plurality of nozzles are located in said transition portion at a top of said ring portion.

3. A camera lens washing device according to claim 2, wherein
a bottom of said ring portion is devoid of any nozzles.

4. A camera lens washing device according to claim 1, wherein
said plurality of nozzles being defined by a plurality of tabs extending from said transition portion toward said main opening of said ring portion, thereby forming fluid path slots of said plurality of nozzles therebetween.

5. A camera lens washing device according to claim 1, wherein
said attachment side of said ring portion includes at least one engagement member.

6. A camera lens washing device according to claim 5, wherein
said at least one engagement member is a snap leg extending from said attachment side.

7. A camera lens washing device according to claim 1, wherein
a sealing member is disposed an inner surface of said ring portion around said main opening.

8. A camera lens washing device according to claim 1, wherein
said fluid source attachment extends from said transition portion in a direction away from said washing side of said ring portion and toward a facing direction of said attachment side of said ring portion, said fluid source attachment is adapted to receive fluid.

9. A camera lens washing device, comprising:
a shroud having a front face, a rear opening opposite said front face, and an inner receiving area therebetween, said front face having a lens opening for receiving a camera lens; and
a washer housing disposed in said receiving area of said shroud, said washer housing including a ring portion and a fluid source attachment, said ring portion having,
a main opening generally aligned with said lens opening of said shroud for receiving the camera lens,
an attachment side configured to mount said washer housing to said shroud, and
a washing side configured to frame the camera lens, said washing side being in fluid communication with said fluid source attachment, and
a plurality of nozzles being disposed in a transition portion of said washer housing between said ring portion and said fluid source attachment of said washer housing, said plurality of nozzles being configured to discharge fluid to said washer side and radially inwardly towards said main opening for receiving the camera lens,
wherein an inner surface of said lens opening of said shroud includes at least one engagement member that engages a corresponding engagement member of said attachment side of said ring portion of said washer housing.

10. A camera lens washing system according to claim 9, wherein
said washer housing is a unitary one-piece housing.

11. A camera lens washing system according to claim 9, wherein
said shroud includes sidewalls extending between said front face and said rear opening, and top and bottom walls extending between said sidewalls; and
said fluid source attachment of said washer housing extending through said rear opening only of said shroud such that no part of said fluid source attachment extends from or through any of said sidewalls or said top and bottom walls of said shroud.

12. A camera lens washing system according to claim 11, wherein
said top wall of said shroud covers said fluid source attachment.

13. A camera lens washing system according to claim 9, wherein
said lens opening of said shroud being sized to receive said ring portion of said washer housing such that said washing side of said ring portion is generally flush with said front face of said shroud.

14. A camera lens washing device according to claim 9, wherein
each of said engagement members is one of a tongue and a snap leg configured to snap onto said tongue.

15. A camera lens washing device according to claim 9, wherein
said lens opening includes an open extension adapted to receive said transition portion of said washer housing.

16. A camera lens washing device according to claim 9, wherein
said plurality of nozzles are located in said transition portion at a top of said ring portion.

17. A camera lens washing device according to claim 16, wherein
a bottom of said ring portion is devoid of any nozzles.

18. A camera lens washing device according to claim 9, wherein
said plurality of nozzles being defined by a plurality of tabs extending from said transition portion toward said main opening of said ring portion, thereby forming fluid path slots of said plurality of nozzles therebetween.

19. A camera lens washing device according to claim 18, wherein
said ring portion includes a recessed area adjacent said plurality of tabs to facilitate fluid flow to said main opening.

20. A camera lens washing device according to claim 9, wherein
a sealing member is disposed an inner surface of said ring portion around said main opening.

21. A camera lens washing device, comprising:
a shroud having a front face, a rear opening opposite said front face, and an inner receiving area therebetween, said front face having a lens opening for receiving a camera lens; and
a washer housing disposed in said receiving area of said shroud, said washer housing including a ring portion and a fluid source attachment, said ring portion having,
a main opening generally aligned with said lens opening of said shroud for receiving the camera lens,
an attachment side configured to mount said washer housing to said shroud, and
a washing side configured to frame the camera lens, said washing side being in fluid communication with said fluid source attachment, a plurality of nozzles being disposed in a transition portion of said washer housing between said ring portion and said fluid source attachment of said washer housing, said plurality of nozzles being configured to discharge fluid to said washer side and radially inwardly towards said main opening for receiving the camera lens, and said plurality of nozzles being defined by a plurality of tabs extending from said transition portion toward said main opening of said ring portion, thereby forming fluid path slots of said plurality of nozzles therebetween, and a recessed area in said ring portion is adjacent said plurality of tabs to facilitate fluid flow to said main opening.

22. A camera lens washing device, comprising:

a unitary one-piece washer housing including a ring portion and a fluid source attachment, said ring portion having, a main opening for receiving a camera lens, an attachment side configured for mounting said washer housing, said attachment side including at least one engagement member, and said at least one engagement member being a snap leg extending from said attachment side, a washing side configured to frame the camera lens, said washing side being in fluid communication with said fluid source attachment, and a plurality of nozzles being disposed in a transition portion of said washer housing between said ring portion and said fluid source attachment of said washer housing, said plurality of nozzles being configured to discharge fluid to said washer side radially inwardly towards said main opening for receiving the camera lens.

* * * * *